United States Patent
Mastrianni et al.

(10) Patent No.: US 6,615,276 B1
(45) Date of Patent: Sep. 2, 2003

(54) METHOD AND APPARATUS FOR A CENTRALIZED FACILITY FOR ADMINISTERING AND PERFORMING CONNECTIVITY AND INFORMATION MANAGEMENT TASKS FOR A MOBILE USER

(75) Inventors: Steven J. Mastrianni, Unionville, CT (US); Ajay Mohindra, Yorktown Heights, NY (US); Dennis G. Shea, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,923

(22) Filed: Feb. 9, 2000

(51) Int. Cl.[7] ................. G06F 15/16; G06F 15/177
(52) U.S. Cl. ................. 709/250; 709/220; 709/248
(58) Field of Search ................. 709/223, 250, 709/220, 221, 248; 345/840, 810, 747, 748; 370/350

(56) References Cited

U.S. PATENT DOCUMENTS

| | | | | |
|---|---|---|---|---|
| 5,996,012 A | * | 11/1999 | Jarriel | 709/226 |
| 6,130,892 A | * | 10/2000 | Short et al. | 370/401 |
| 6,412,025 B1 | * | 6/2002 | Cheston et al. | 710/8 |
| 6,446,260 B1 | * | 9/2002 | Wilde et al. | 717/173 |
| 6,477,581 B1 | * | 11/2002 | Carpenter et al. | 709/238 |

FOREIGN PATENT DOCUMENTS

GB 2330502 A * 4/1999 ........... H04L/29/06

OTHER PUBLICATIONS

Pogue, David, "PalmPilot: The Ultimate Guide, Second Edition", O'Reilly, ISBN: 1–56592–600–5, excepts from chapters 6, 8 and 14, Jun. 1999.*

Mohindra, A. et al., "Dynamic insertion of object services", Proceedings of the USENIX conference on Object–Oriented Technologies (COOTS), www.usenix.com, pp. 13–20, Jun. 1995.*

Chang, H et al., "Web browsing in a wireless environment: disconnected and asynchronous operation in ART our Web Express", ACM/IEEE International conference on Mobile computing and networking, ISBN: 0–89791–988–2, pp. 260–269, Sep. 1997.*

Purakayastha, A. et al., "System management with Net-Script", Proceedings of the Twelfth Systems Administration Conference (LISA XII), www.usenix.com, pp. 37–48, Dec. 1998.*

Norton, P. et al., "Peter Norton's Complete Guide to Norton SystemWorks 2.0", Macmillan Computer Publishing (SAMS), ISBN: 0–672–31528–9, Appendix D, Apr. 1999.*

Butrico, M. et al., "Enterprise data access from mobile computers: an end–to–end story", IEEE Proceedings on Research Issues in Data Engineering, ISBN: 0–7695–0531–7, pp. 9–16, Feb. 2000.*

* cited by examiner

Primary Examiner—Zarni Maung
Assistant Examiner—Jason D. Cardone
(74) Attorney, Agent, or Firm—Gail H. Zarick, Esq.; McGinn Gibb, PLLC

(57) ABSTRACT

A software facility for administering and executing connectivity and information management tasks for a portable device, includes a module for selectively adding, deleting, and editing a location object, and a module for selectively initiating a request for a connection, disconnection, and information synchronization, based on the location object. The location object represents all location-specific information for the portable device and includes an information object including information management tasks that must be performed for a specific location for the portable device to connect to a remote network.

37 Claims, 18 Drawing Sheets

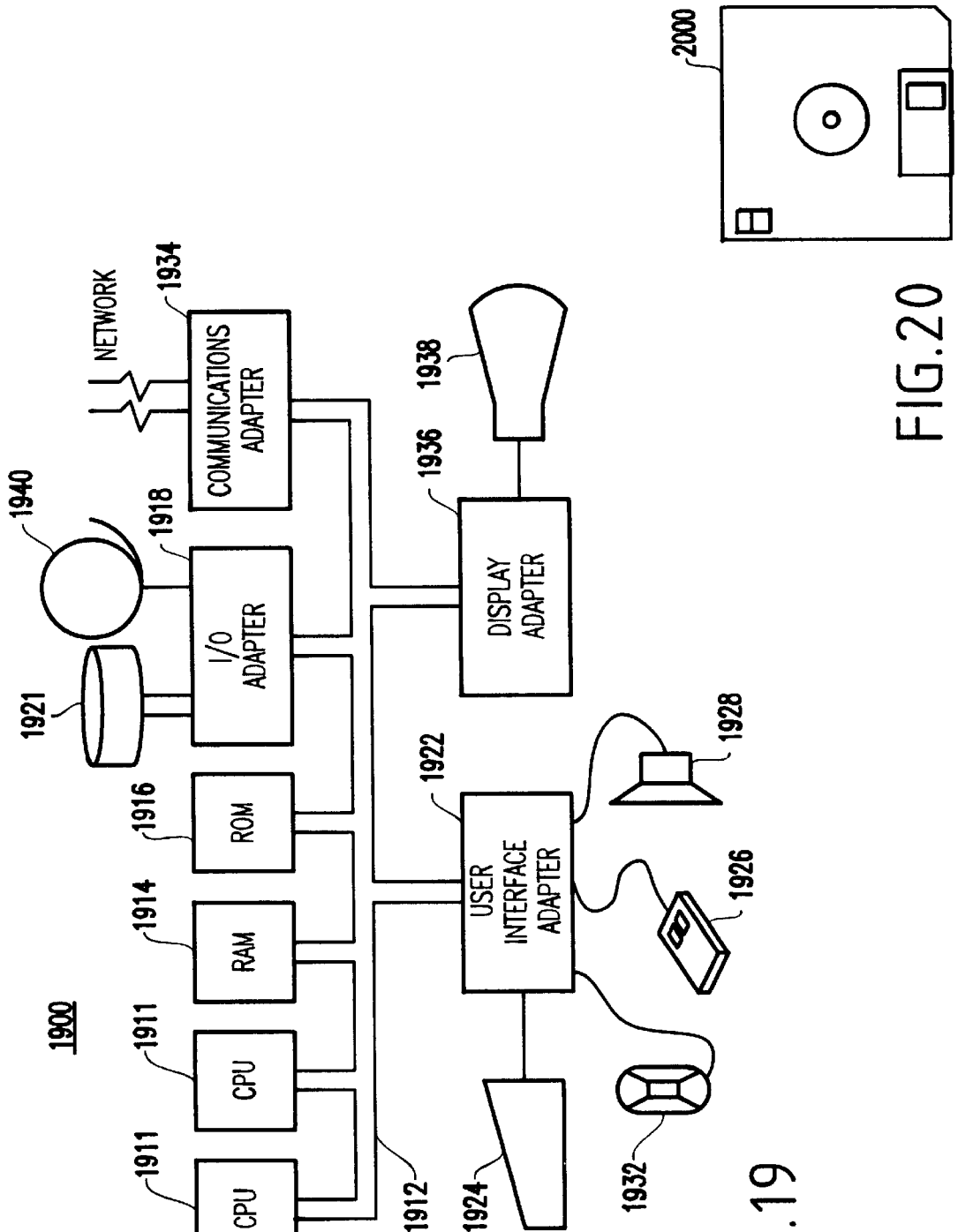

METHOD AND APPARATUS FOR A CENTRALIZED FACILITY FOR ADMINISTERING AND PERFORMING CONNECTIVITY AND INFORMATION MANAGEMENT TASKS FOR A MOBILE USER

CROSS-REFERENCE TO RELATED APPLICATIONS

The present application is related to U.S. patent application Ser. No. 09/500,993, filed on Feb. 9, 2000, to Mastrianni et al., entitled "METHOD AND APPARATUS FOR PROVIDING AUTOMATIC CONFIGURATION OF A COMPUTER SYSTEM BASED ON its PHYSICAL LOCATION USING ELECTRONIC UNIT" having IBM Docket No. YO999-554, and to U.S. patent application Ser. No. 09/501,295, filed on Feb. 9, 2000, to Bantz et al., entitled "METHOD AND APPARATUS FOR PROVIDING AUTOMATIC CONFIGURATION OF A COMPUTER SYSTEM BASED ON ITS PHYSICAL LOCATION USING AN ELECTRONICALLY READ SCHEDULE", having IBM Docket No. YO999-571, each in their entirety incorporated herein by reference.

BACKGROUND FOR THE INVENTION

1. Field of Invention

The present invention relates to software applications for mobile users, and more particularly to a method and apparatus for providing a centralized facility for administering and performing connectivity and information management tasks for a mobile user.

2. Description of the Related Art

Due to availability of cheaper, smaller and more powerful computers (e.g., laptops and the like), and easy accessibility to networking infrastructure such as a local area network (LAN) and/or a telephone connection, an increased number of people are traveling with their computers. The set of options for connecting to the network and the set of resources that are available to a user are largely determined by the physical location where the user is currently located.

For example, if a user is in an office in New York, then the user would connect to the office network using a local area network and would have access to all the services such as scanners and printers located at the office in New York. If for some reason, the users travels with his computer to his branch office in Florida, then the user would have access to resources available at the branch office in Florida. During the trip, if a user stays at a hotel somewhere or travels through an airport, then the user would have access to resources available at the hotel or the airport, respectively.

Typically, at a hotel, the user would use the telephone lines to dial into the office network, and use the printers available at the hotel. After establishing a network connection, a typical user would use variety of software applications to access and manage the information that the user is interested in. For example, to send and receive mail, the user would employ an e-mail client such as Lotus Notes® or Microsoft Outlook®. To transfer files between the user's computer and the office server, the user would either manually copy files or use a file transfer application.

However, a major problem with the current computer system configuration is that the user has to frequently update the computer system configuration parameters whenever the user connects from a different physical location (e.g., hotel, airport, etc.). Such computer system configuration parameters include telephone numbers for connecting to the local service provider, network parameters such as domain name servers, Internet Protocol (IP) address, and printer settings.

This chore is further complicated in that this information must be updated using several software applications, and any inconsistency in updating any of the configuration information can render the computer useless for that physical location. This is a problem.

It is noted that some commercial products (e.g., Symantec's Mobile Essentials®) attempt to provide some centralized management and deployment of location profiles. The location profiles include general location information (e.g., country, city and time zone), dialing, network settings for transmission control protocol (TCP)/Internet Protocol (IP) and dial-up, printer configuration and profile setting for other applications such as Web Browsers and E-mail clients. However, this system is deficient in information task management and location management. That is, this product does not allow the user to centrally manage and perform information management tasks such as synchronizing file data, sending and receiving electronic mail, and cache web pages for offline browsing.

Another commercial product (e.g., 3Com's DynamicAccess Mobile Connection Manager®) supports creation of multiple standard LAN and remote access configurations. It features single click switching between locations and supports read-only locations for troubleshooting and ease of maintenance.

However, similarly to Symantec's product, this product is deficient in information task management and location management. That is, this product does not allow the user to centrally manage and perform information management tasks such as synchronizing file data, sending and receiving electronic mail, and cache web pages for offline browsing.

Thus, while it may be possible for travelers, etc. to connect to their "home" network (e.g., an Intranet or the like) etc., there is a lot of work, trouble and inconvenience for the users in establishing a network connection. That is, much configuration of the computer must be changed in establishing a successful network connection and gaining access to the user's data, e-mail, other network resources, etc.

Further, existing products are geared to home users. There are no known products which concentrate on the corporate mobile environment. 3COM, for instance, does not support the Token Ring network interface which is widespread in the corporate environment.

SUMMARY OF THE INVENTION

In view of the foregoing and other problems, drawbacks, and disadvantages of the conventional systems and methods, an object of the present invention is to provide an intuitive physical location-based abstraction for administering and performing connectivity and information management tasks.

Another object of the present invention is to provide a system and method for information task management and location management, that allow a user to centrally manage and perform information management tasks such as synchronizing file data, sending and receiving electronic mail, and caching web pages for offline browsing.

In a first aspect of the present invention, a software facility for administering and executing connectivity and information management tasks, includes a unit for selectively adding, deleting, and editing location objects, and a unit for initiating request for a connection, disconnection, and information synchronization.

In a second aspect, a location object that represents all location specific information, includes an information object that includes all information management tasks (e.g., such as file synchronization, web page caching, and mail synchronization), that must be performed for a specific location.

In a preferred embodiment, a software application called a "Location Manager" is provided. The Location Manager allows a user to define and manage location objects, and provides an apparatus and method for establishing a network connection and perform information management tasks that a user is interested in. The "Location Manager" allows the user to reconfigure different location profiles for different sites, so that if the user wishes to travel to Tampa, Florida, the user can select the Tampa site from the location profile, and the invention will automatically reconfigure all of the required parameters for that site, so that the user can immediately connect to the network.

Further, the preferred embodiment also defines an abstraction of a location object. The location object captures user-defined location-specific information such as the geographic location of a user, network and dial-up information, network resources such as printers, mapped drives, and all information management tasks such as file synchronization, web page caching, and mail synchronization, that must be performed for a specific location Thus, the present invention provides a user with a centralized facility to administer and manage all computer system configuration parameters that must be updated whenever the user and his computer change physical location. In addition, it also provides the user with a single point of control for managing all information tasks such as synchronizing file data, sending and receiving electronic mail, and caching web pages for offline browsing.

Further, while existing products assume one type of LAN connection, the present invention provides for a completely different type of LAN connection at every location.

BRIEF DESCRIPTION OF THE DRAWINGS

The objects, features and advantages of the present invention will be apparent to one skilled in the art, in view of the following detailed description taken in combination with the attached drawings, in which:

FIG. 19 illustrates an exemplary information handling/computer system 1900 for use with the invention on the client (user) side; and FIG. 20 illustrates a medium 2000 for storing a program for implementing the method according to the present invention.

DETAILED DESCRIPTION OF THE PREFERRED EMBODIMENT OF THE PRESENT INVENTION

Figure 1:
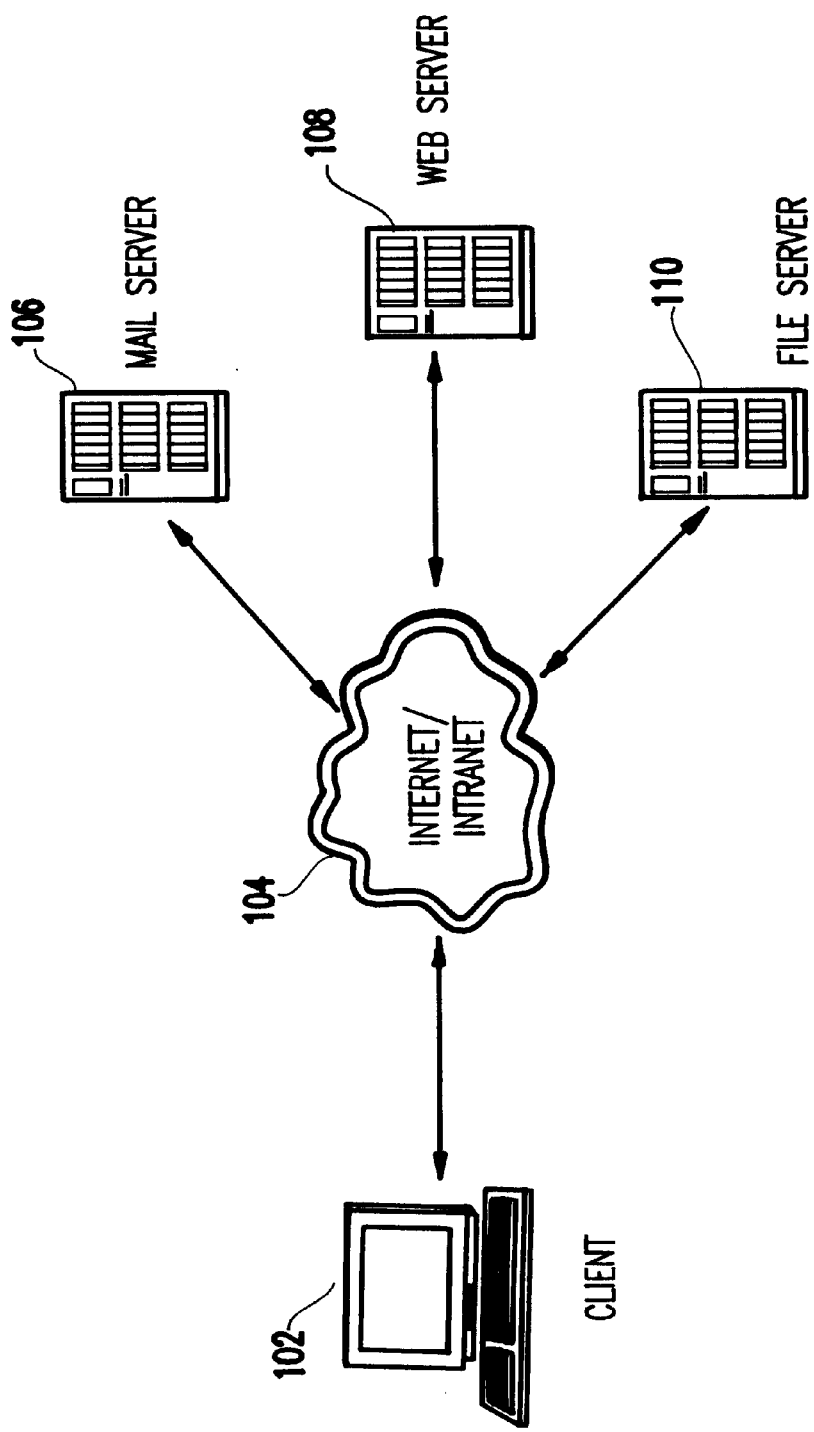
FIG. 1 illustrates a preferred system configuration according to the present invention.

FIG. 1 illustrates a preferred system configuration for the invention. Preferably, the present invention is installed on a client computer 102. The client computer can be advantageously embodied by a laptop personal computer (PC), but of course other portable devices would also find great benefit with the invention, as would be known by one of ordinary skill in the art taking the present application as a whole. FIG. 19 described below illustrates an exemplary form which the client computer may take.

The client 102 computer has an operating system such as Windows 95®, Windows 98®, Windows NT®, or Linux® and appropriate hardware adapters such as a modem, cable modem, DSL modem, token-ring, or Ethernet, to connect to the Internet/Intranet 104.

The client 102 also includes appropriate software drivers installed to enable it to use the TCP/IP communication protocol over the hardware adapters. In addition, the client computer 102 has all the necessary software applications that a users uses to manage its routine information management tasks. These applications include a web browser, a dialer and mail clients. The web browser can be embodied by Netscape Navigatorg or Microsoft's Internet Explorer®, a dialer can be embodied by AT&T's Global network dialer; and mail clients can be embodied by Lotus Notes®, Microsoft Outlook®), or Eudora®.

A user uses the client computer 102 to perform information management tasks with the server connected to the Internet/Intranet. These tasks include sending and receiving electronic mail from a mail server 106, retrieving web pages from a web server 108, and sending and receiving data files from a file server 110. These servers can be embodied, for example, as an IBM RISC® System 6000 computer running the AIX™ operating system, or a PC running Microsoft's Windows NT® Server operating system.

Figure 2:
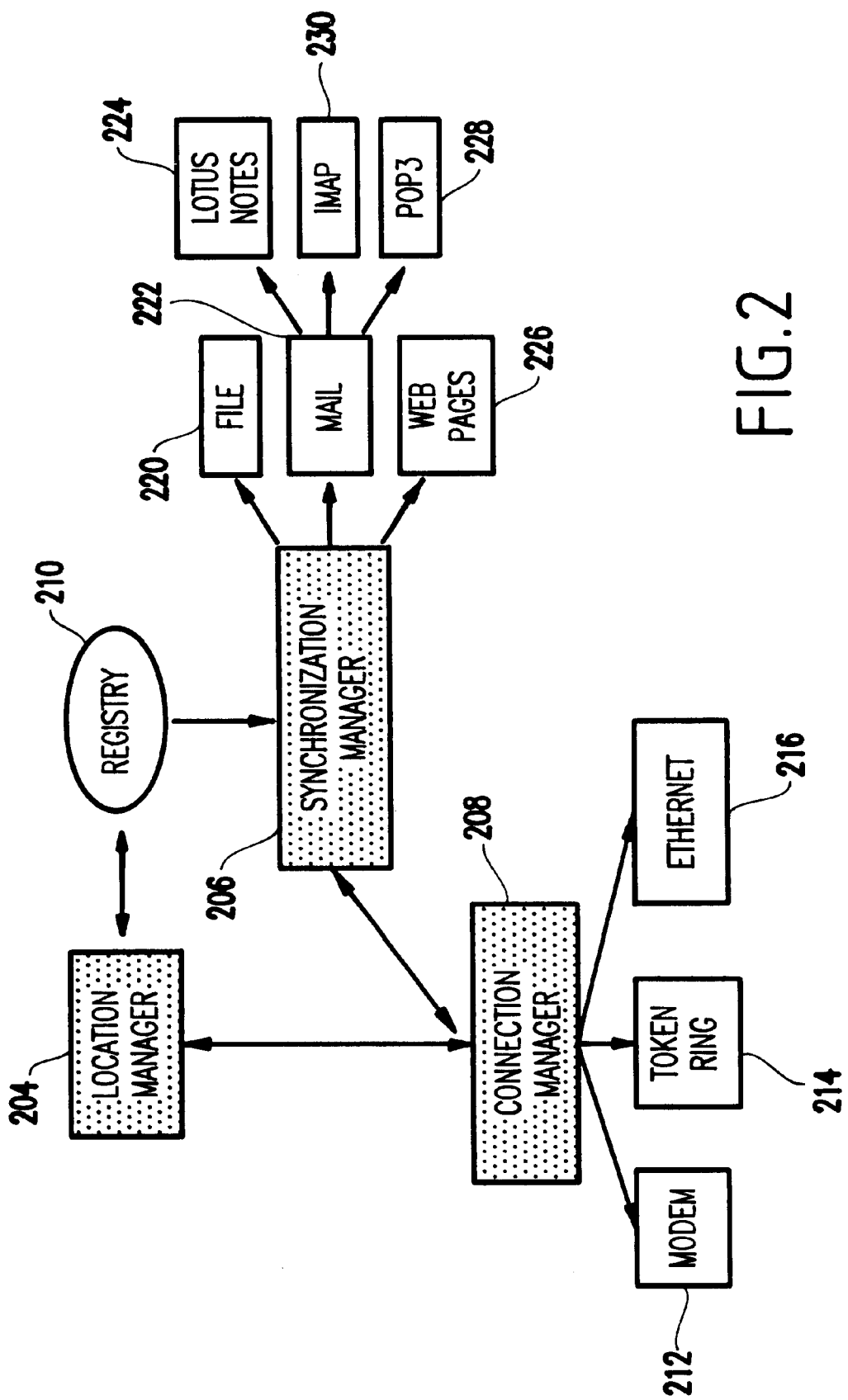
FIG. 2 illustrates a logical software block diagram according to the present invention.

FIG. 2 illustrates a logical software block diagram for the present invention. It includes three modules including a Location Manager 204, a Synchronization Manager 206 and a Connection Manager 208.

The Location Manager 204 provides functionality for administering and managing location-specific information that is stored by the present invention in a Registry 210. The Registry 210 is a database in which the Windows® operating systems maintain the configuration information of all the installed programs. The functionality about the Location Manager 204 is described below.

The Synchronization Manager 206 module provides the functionality to send and receive electronic mail 222, synchronize file data 220 and retrieve and hoard (e.g., store) web pages 226 for off-line browsing. The Mail 222 submodule provides functionality to retrieve mail using the Lotus Notes® 224, Microsoft Exchange®, Internet Message Access Protocol (IMAP®) 230 and Post Office Protocol Version 3 (POP3® 228 protocols.

The Connection Manager 208 provides connectivity functionality to establish a network connection using a modem 212, a token-ring card 214 and an Ethernet card 216. It also provides a graphical user interface (GUI) to enable a user to initiate synchronization.

Figure 3:
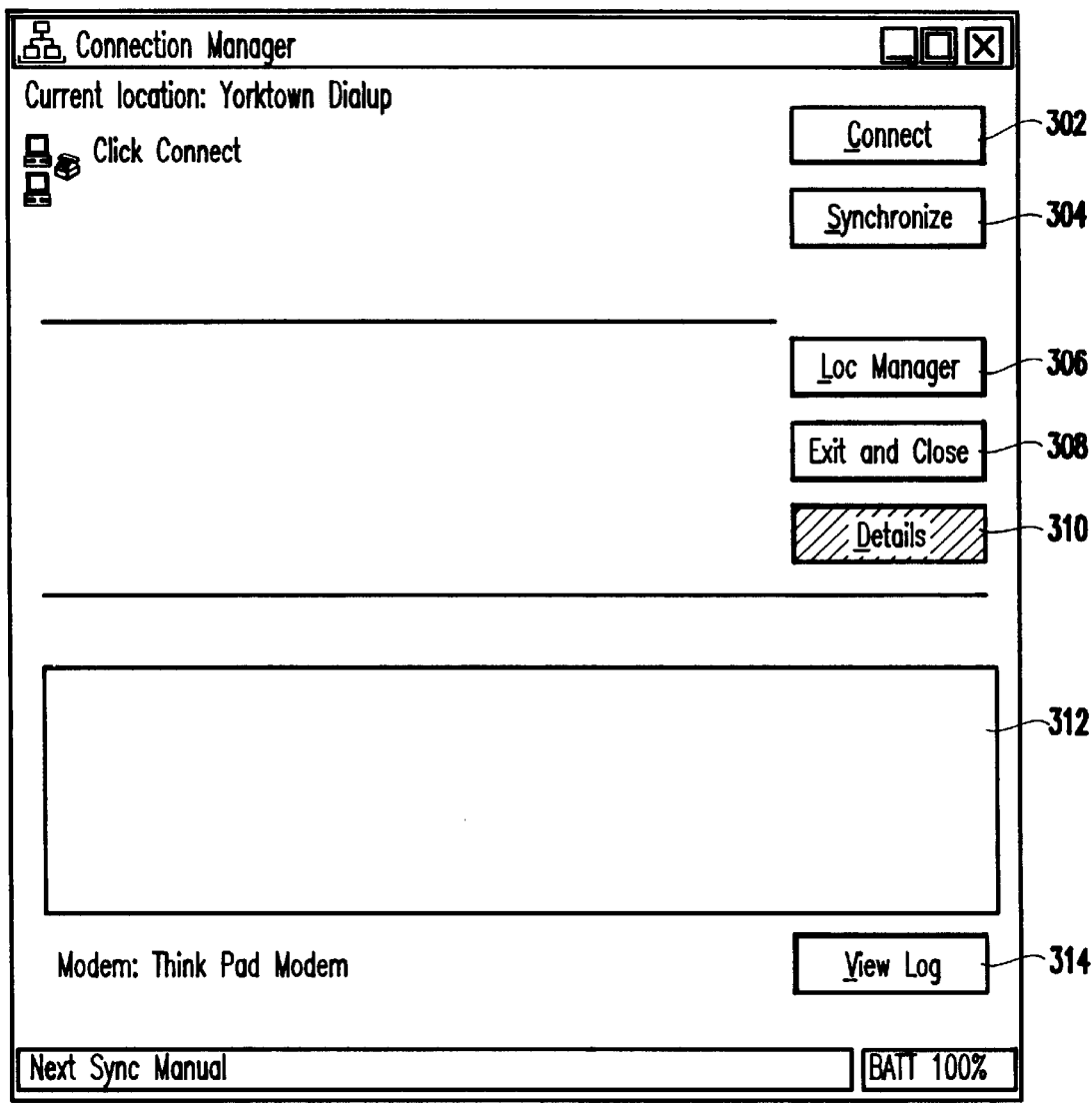
FIG. 3 shows a graphical user interface (GUI) associated with a Connection Manager 208 according to the present invention.

FIG. 3 shows an exemplary graphical user interface for the Connection Manager 208 when a user launches the invention. It is noted that the information may be presented different and that other GUIs are also possible, depending upon the designer's constraints and requirements. Thus, the "look and feel" of the GUI can be easily tailored as desired by the designer.

The Connection Manager 208 presents the user with a Connect button 302, a Synchronize button 304, a Location Manager button 306, an Exit and Close button 308, a Details button 310, and a View Log button 314.

The Connect button 302 instructs the Connection Manager 208 to establish a connection to the network. Based on available user preferences stored in the current location, establishing a connection may entail dialing out via a modem, or setting up a network connection either using a token-ring or an Ethernet adapter.

The Synchronize button 304 instructs the Connection Manager 208 to initiate synchronization (e.g., send and receive files and electronic mail and hoard any web pages that the user has specified for the current location).

The Location Manager button 306 instructs the Connection Manager 208 to start the Location Manager 204 program. The Location Manager 204 allows a user to manage all location-specific information that the present invention uses. Details about the Location Manager 204 are described below.

The Details button 310 enables a user to view the progress of the Connection Manager 208 in the status area defined by the status window 312. The View Log button 314 allows a user to view the log file associated with the Connection Manager 208. The log file captures details about the progress of the Connection Manager 208 session. The log file is stored on a hard disk of the computer (e.g., the client) on which the present invention is installed. The information contained in the log file can be used for diagnostics if a problem is encounterd during synchronization and/or connection establishment.

Figure 4:
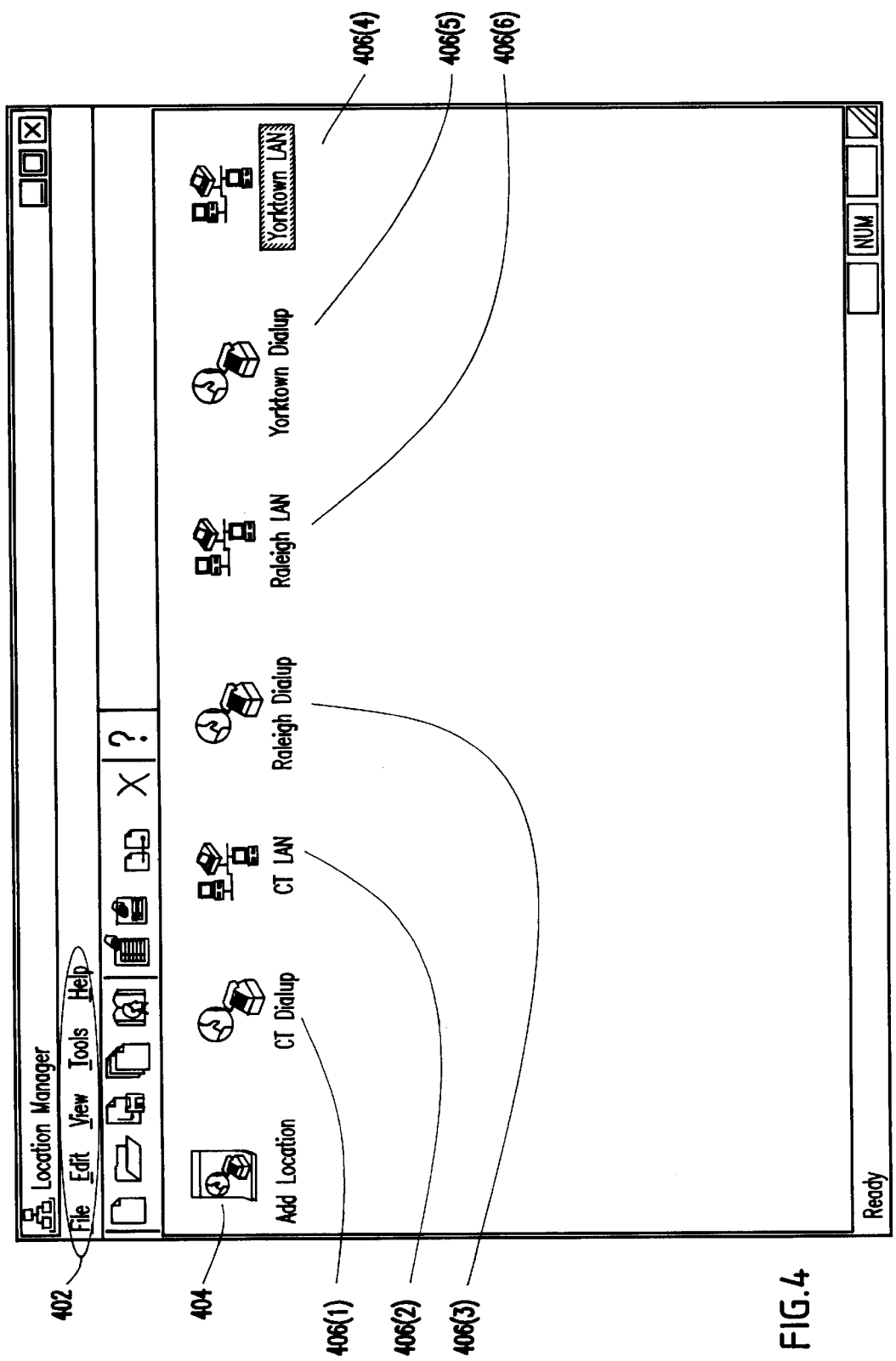
FIG. 4 shows the initial graphical user interface (GUI) associated with a Location Manager 204 according to the present invention.

When a user selects the Location Manager button 306, the invention presents the user with the GUI shown in FIG. 4. The user interface offers the user standard Windows® specific menu selection 402 for managing location specific information. Menu selections include finctions to create new locations, import, export and print location data, designate a default location, undo changes made by the user, help, etc. Locations that have already been created and managed by the Location Manager 204 are displayed with user-supplied names 406(1)–406(6). The Location Manager 204 also allows a user to create and add a new location(s) using the Add Location icon 404. A user may choose to assign a name to individual locations that reflects the configuration information contained in the location.

For example, a pre-configured location in FIG. 4 named "CT Dialup" 406(1) corresponds to a location that is valid in Connecticut with a dial-up connection while the one named "Yorktown LAN" 406(6) corresponds to a location that is valid in Yorktown with a local area network (LAN) connection. When a user selects the "Add Location" icon, the user is presented with the user interface shown in FIG. 5.

Figure 5:
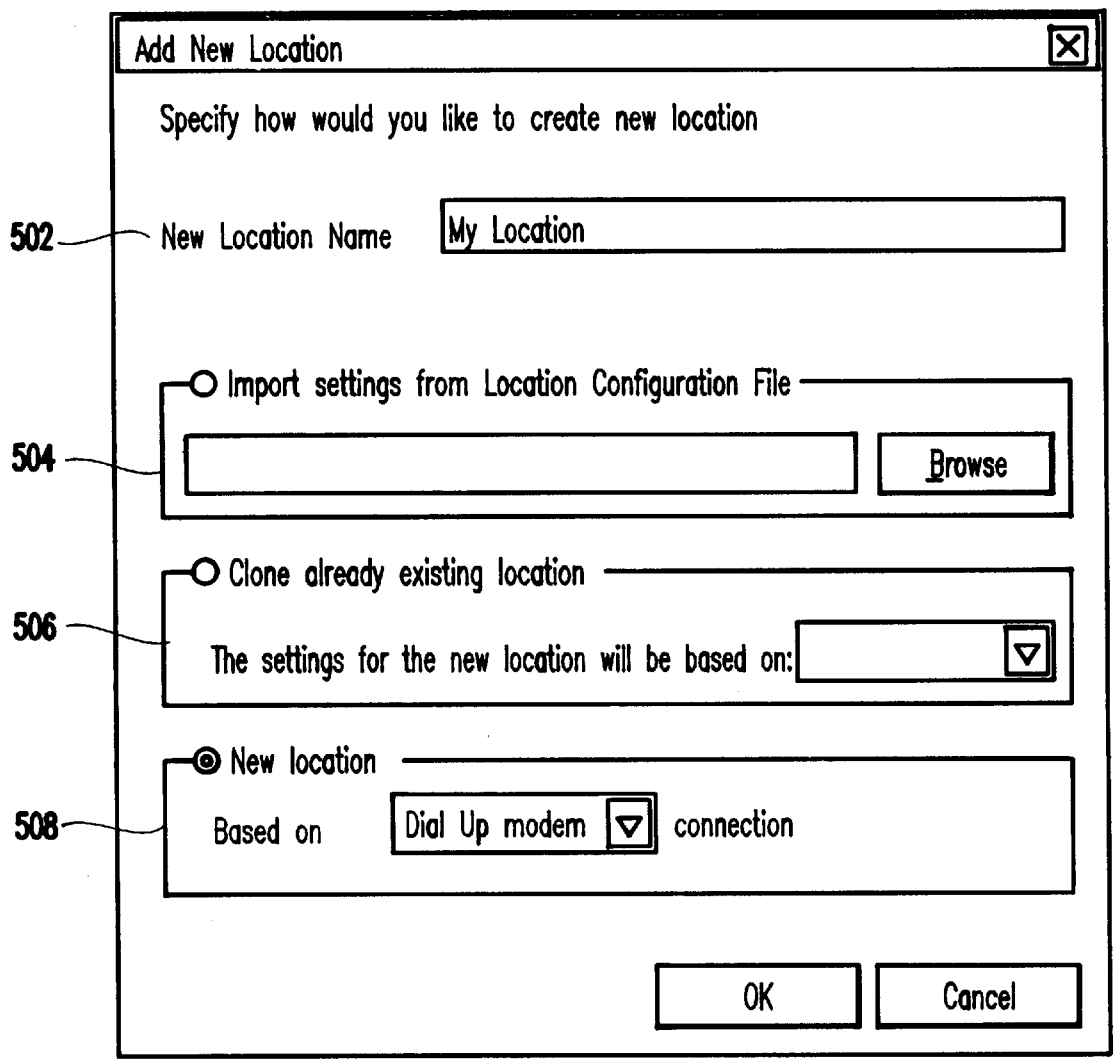
FIG. 5 shows a configuration screen for adding a new location.

FIG. 5 shows the information that a user supplies to create a new location. First, the user is required to supply a name for the location 502. The user can then either import a pre-configured location 504, clone an existing location 506, or create a new location 508. If a user chooses to import or clone an existing location, then the new location is configured with the setting stored with the original location.

If a user selects to create a new location, then the user is presented with a series of user input interfaces (FIGS. 6–18) that allow the user to configure the new location with all of the relevant configuration information. The information specified by the user is stored in the registry 210 (e.g., shown in FIG. 2) under the heading of the user-specified name.

Figure 6:
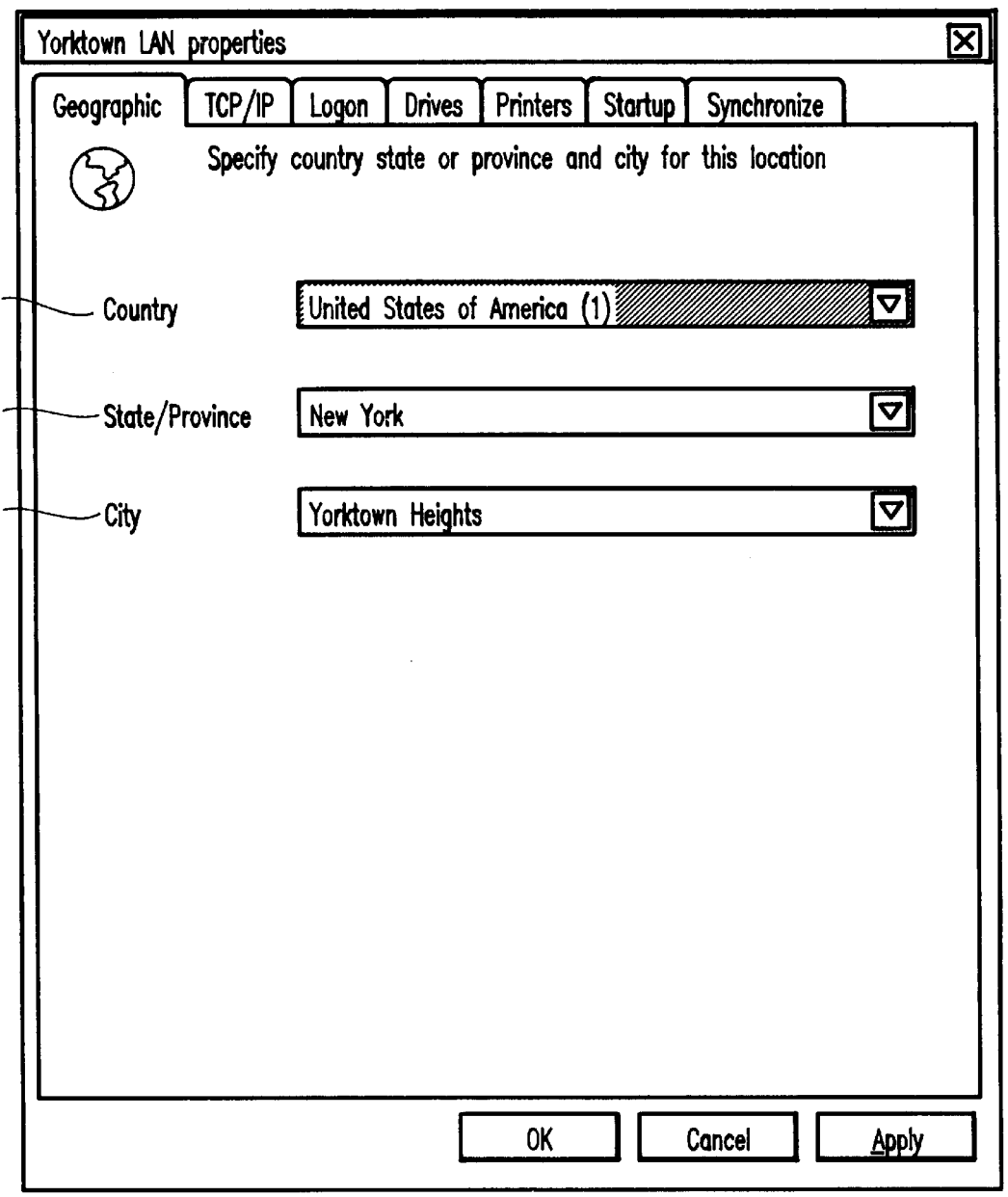
FIG. 6 shows a configuration screen for specifying geographic information.

FIG. 6 shows the interface for the user to specify the geographic information relevant to this location. The information includes the name of the Country 602, State/Province 604 and City 606.

Figure 7:
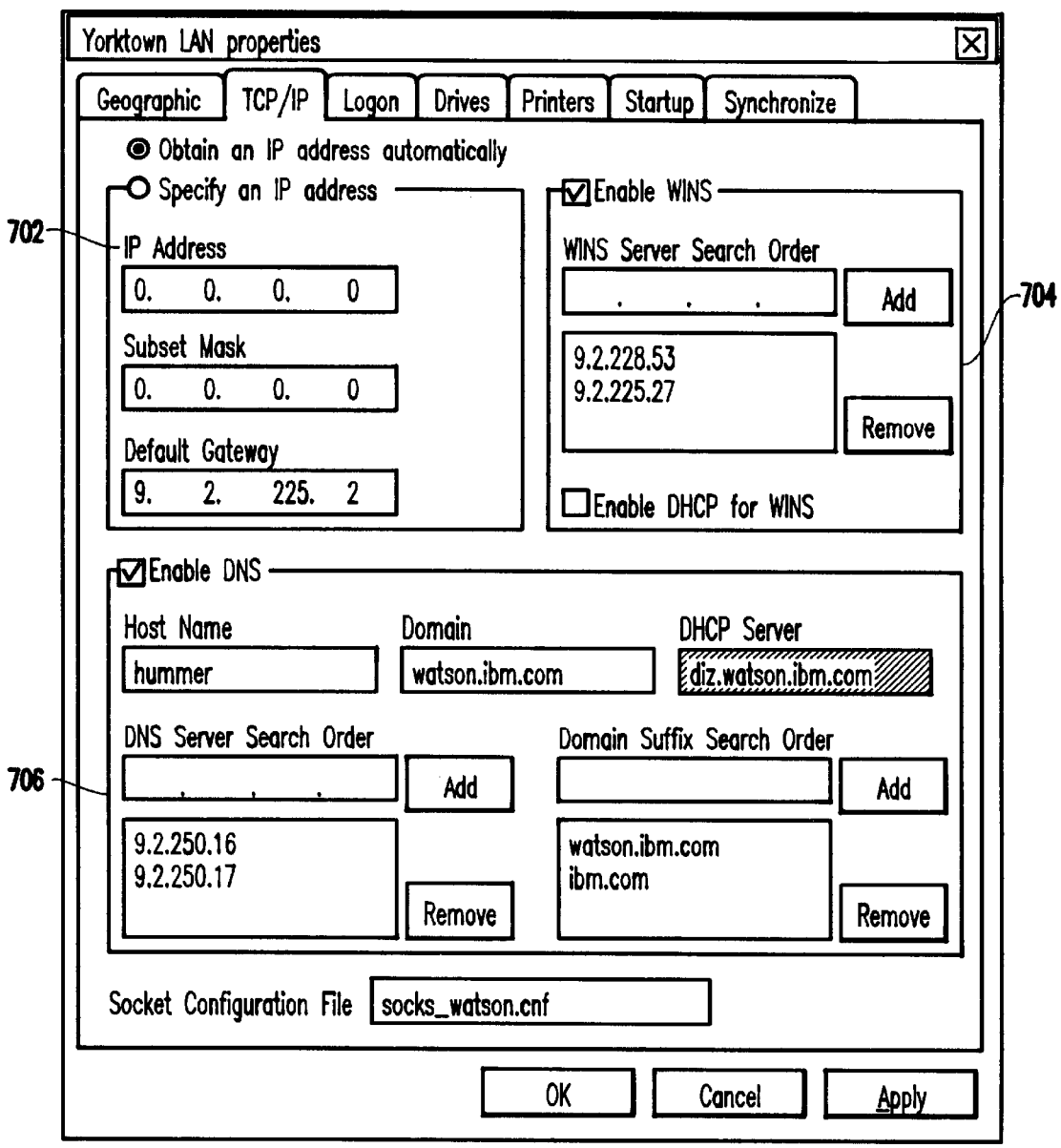
FIG. 7 shows a configuration screen for specifying the transmission control protocol/Internet protocol (TCP/IP) settings.
Figure 8:
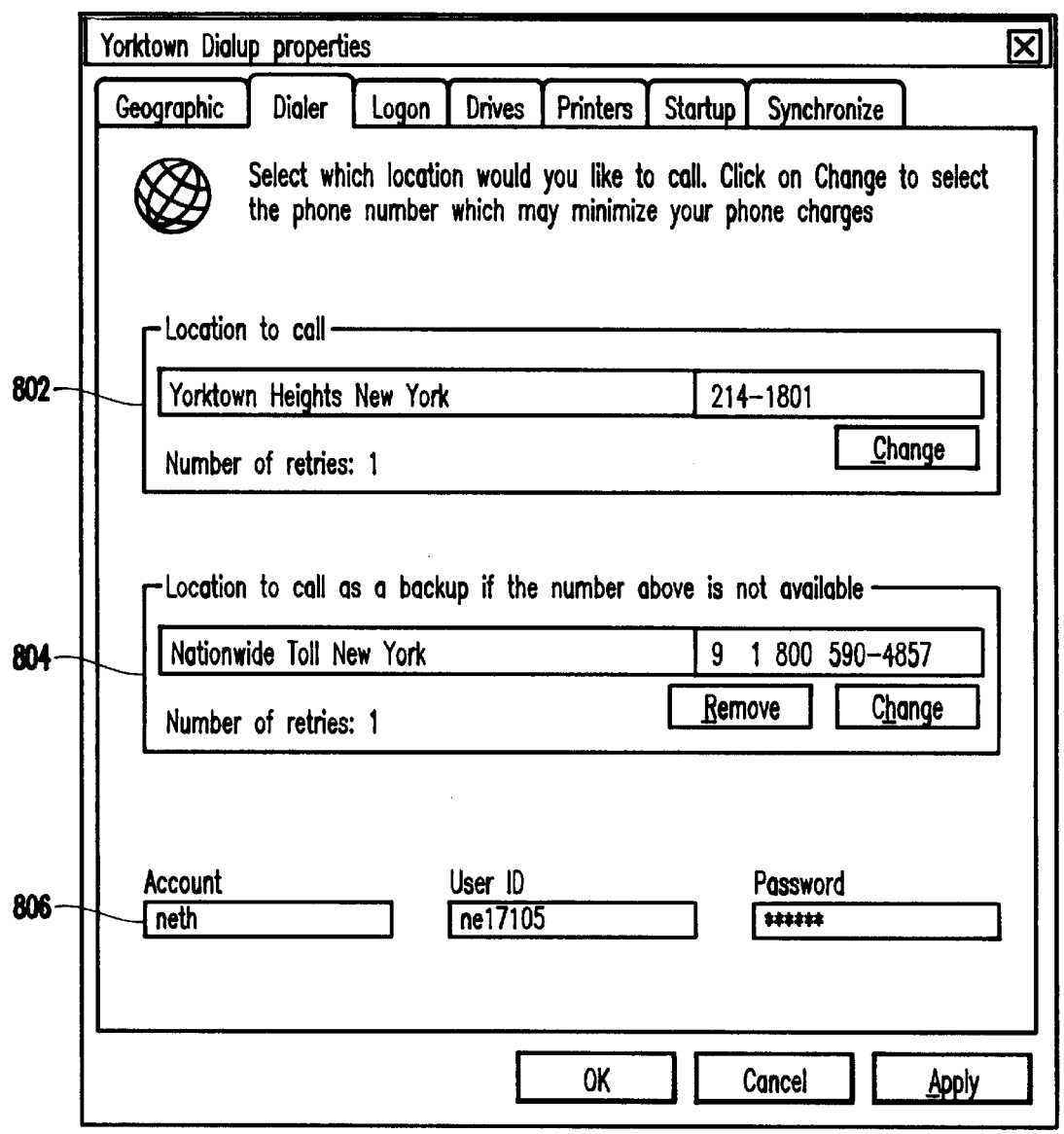
FIG. 8 shows a configuration screen for specifying dial-up settings.

FIGS. 7 and 8 shows an interface for the user to specify the TCP/IP and Dial-up related information for the location. The TCP/IP interface is displayed if the user wants to configure the this location for use with a TCP/IP protocol.

In 702, a user specifies the IP Address, subnet mask, and default gateway address for use with this location. This information is only needed if the user selects the "Specify an IP address" radio button.

In 704, the user specifies the WINS (Windows Internet Naming Service) server address. The user is also allowed to enable/disable this option using the "Enable DHCP or WINS" checkbox.

In 706, the user specifies whether to use the Domain Name Server (DNS) for the specific location. If enabled, then the user must specify the Host Name, domain name, dynamic host configuration protocol (DHCP) server name, and Domain Name Server (DNS) Search Order and Domain Name suffix order. The user also specifies the SOCKS configuration file, if any, that is valid for the location.

SOCKS is a networking proxy protocol that enables hosts on one side of a SOCKS server to gain full access to hosts on the other side of the SOCKS server without requiring direct IP reachability. SOCKS redirects connection requests from hosts on opposite sides of a SOCKS server. The SOCKS server authenticates and authorizes the requests, establishes a proxy connection, and relays data. SOCKS is commonly used as a network firewall that enables hosts behind a SOCKS server to gain full access to the Internet, while preventing unauthorized access from the Internet to the internal hosts.

A "SOCKS" configuration file contains information about the SOCKS servers in a corporate network (e.g., an Intranet). Most corporate Intranets are protected by a firewall, to prevent outside users from looking inside a corporation's computer. By the same token, for protection, most corporate users cannot look at outside computers. To bypass such protection and allow computers inside the firewall (Intranet) to look at (access) computers outside the Intranet (and hence outside the firewall), a SOCKS gateway or program is provided which enables computers inside the firewall to access computers outside the firewall. The SOCKS configuration file is used by the invention if the computer is located behind a firewall. Such a SOCKS program is available commercially and is separate from the operating system.

If the current location is being configured to use a dial-up modem connection, then the user specifies the appropriate information in the input screen shown in FIG. 8. The information specified by the user includes the primary 802 and backup 804 telephone number to dial, number of retries, and any information related to the account name, user-id and password information for the account 806.

Figure 9:
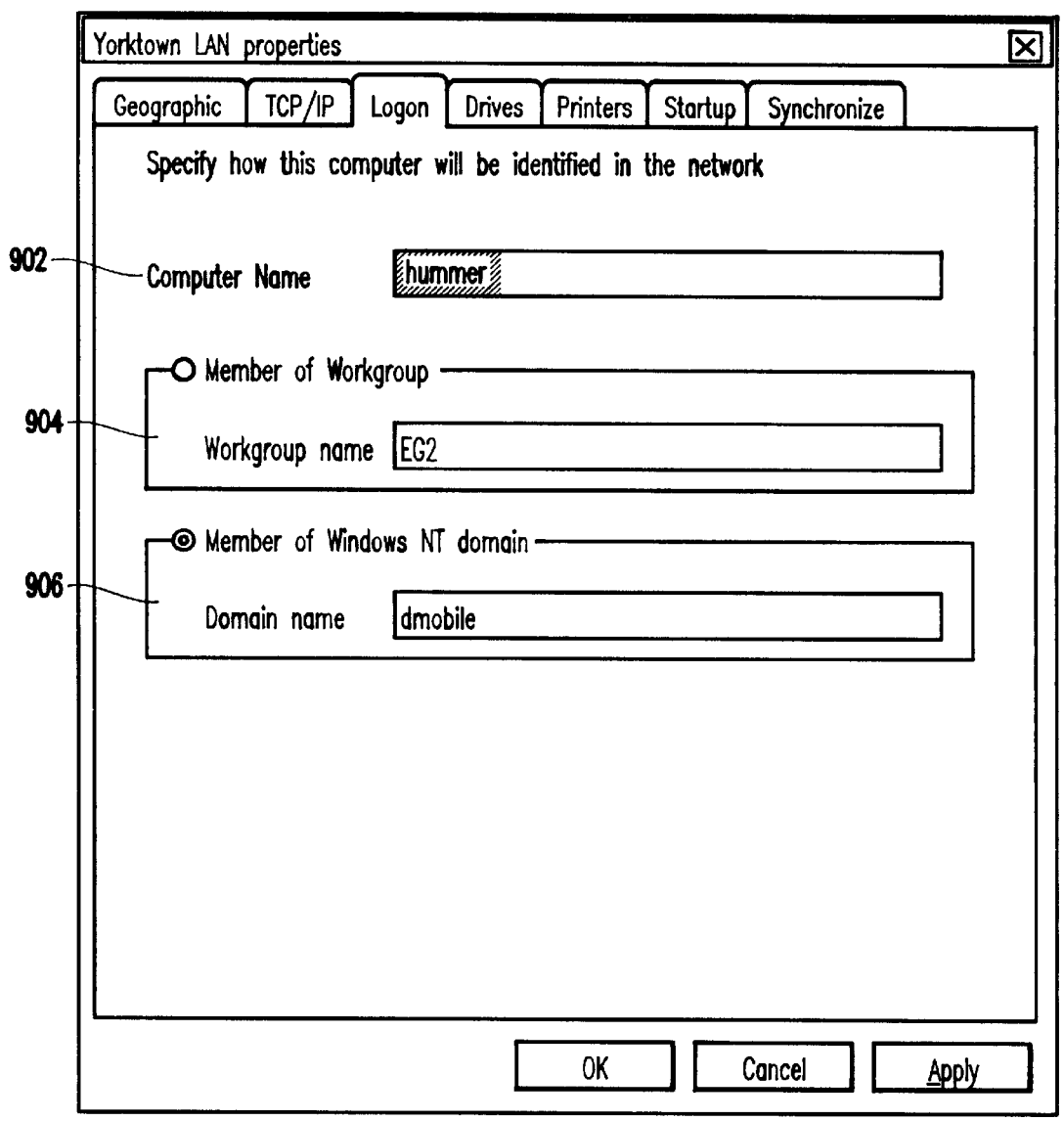
FIG. 9 shows a configuration screen for specifying computer identity settings.

The input screen shown in FIG. 9 contains information about the identity of the computer when it is connected to the network. This information includes Computer Name 902 (e.g., any arbitrary name may be selected by the user), and name of the workgroup 904 or Windows NT® domain name 906, if the computer belongs to any. It is noted that the user should preferably follow some conventions, and thus the names may remain fixed once selected (e.g., if not using DHCP), or may be changeable (e.g., if using DHCP) depending upon the conventions the system is under.

Figure 10:
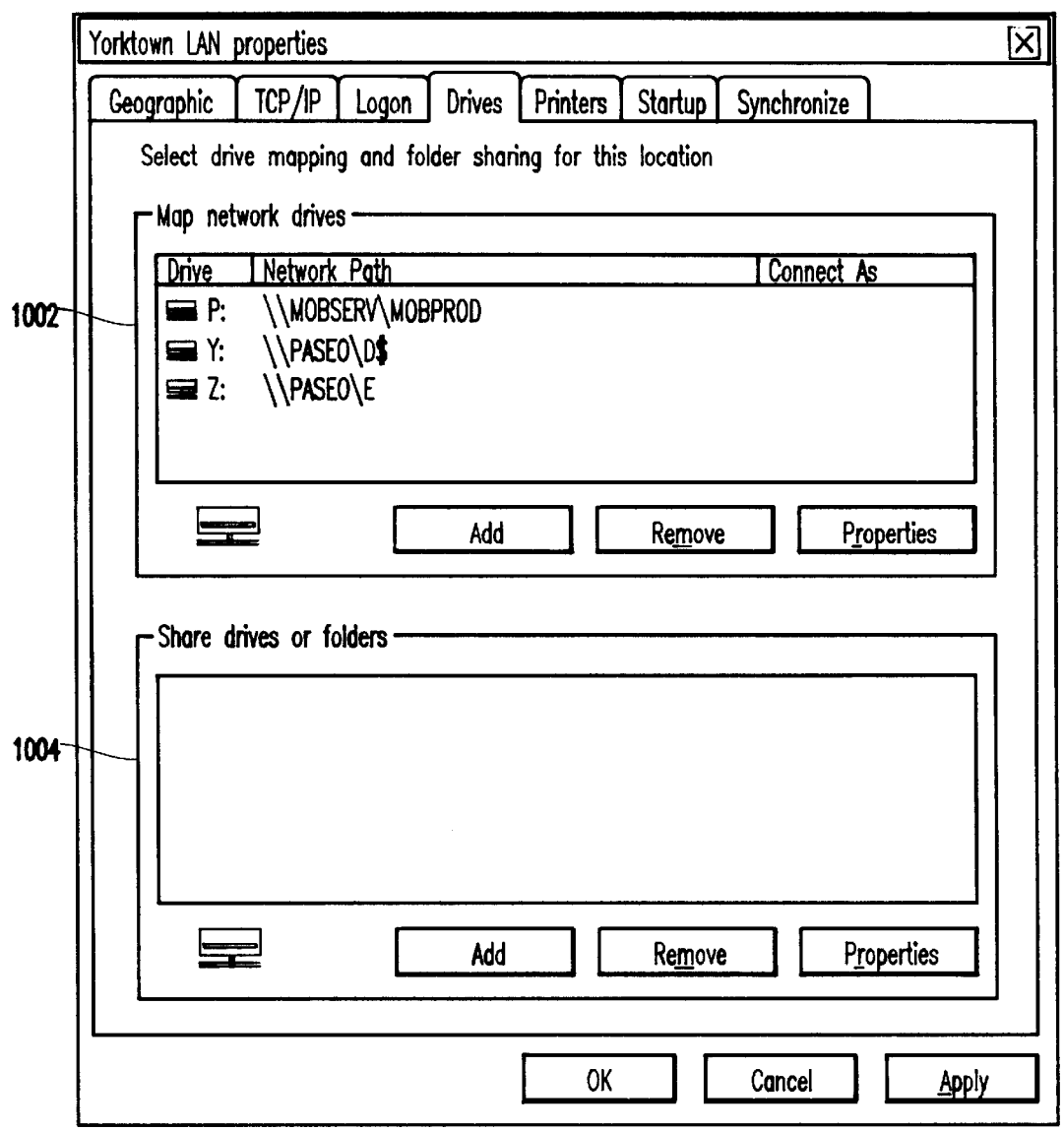
FIG. 10 shows a configuration screen for specifying drive mapping and folder sharing settings.

The input screen shown in FIG. 10 contains information about the set of network drives that should be mapped on the local computer when the network connectivity is established. The set of drives specified by the user in 1002 are automatically mapped on the local drive when a user connects.

Regarding "automatically mapping the network drives", it is noted that a personal computer typically includes a A and B drive (floppy diskette drives) and and a C drive. The C drive typically includeshard disk drives (or a drive with logical partitions). Windows® supports the capability of a user's hard drive to map to a network mount drive operation such that someone else's C drive may appear on the user's computer as an S drive by specifying this drive mapping. Thus, with the invention, if the user visits New York, the user may wish to network map the local drives and folders so as to share the data therein by automatically mapping upon connection.

Further, the user can also specify in 1004 any of the local drives and folders that should be shared with other computers on the network.

Figure 11:
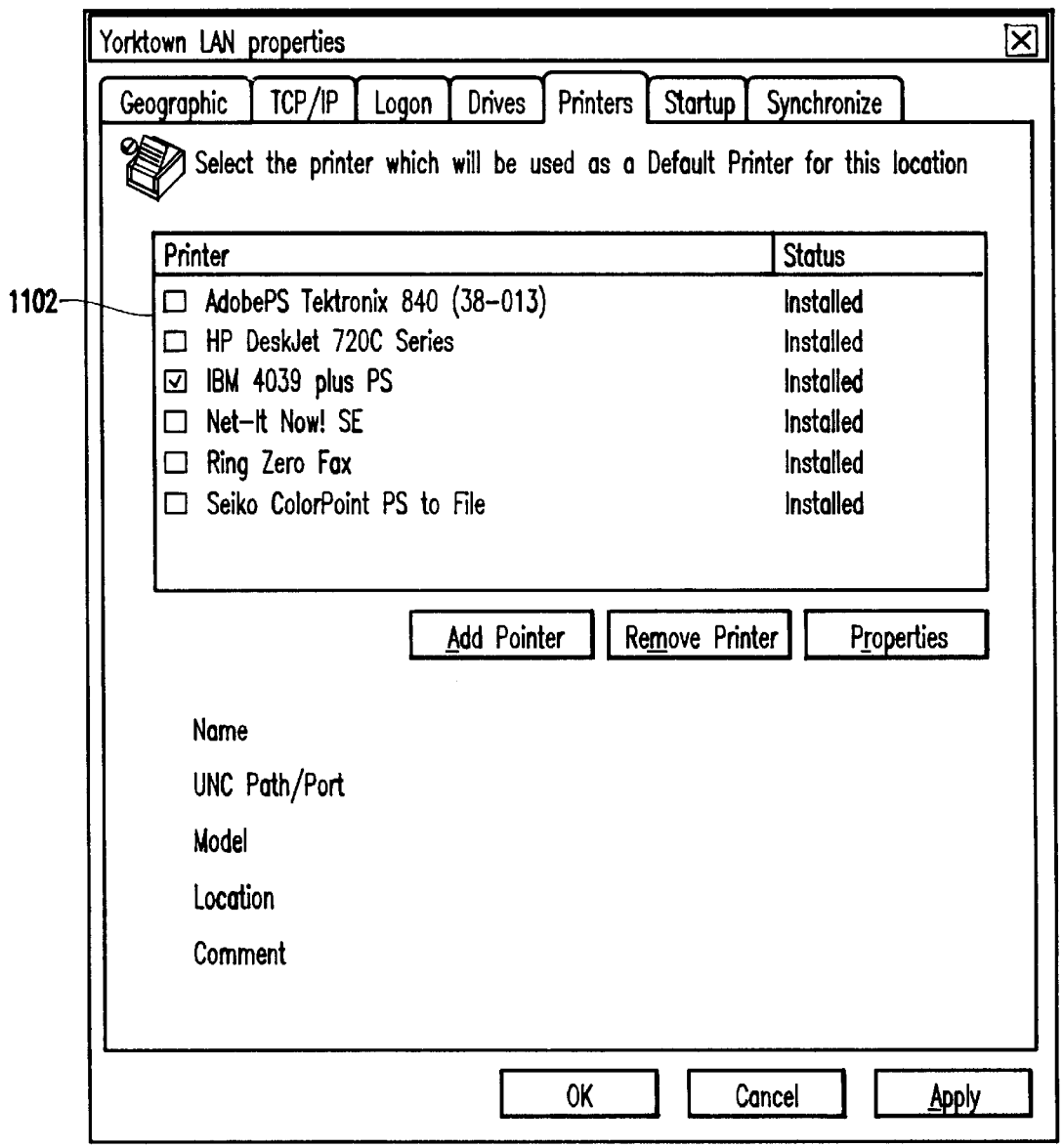
FIG. 11 shows a configuration screen for specifying printer settings.

FIG. 11 shows the set of printers in 1102 that a user would like to configure for a specific location. After being added (e.g., configured) by the user, these set of printers are automatically configured when a user connects using a specific location. A user can add or remove printers using the options available on this screen.

Figure 12:
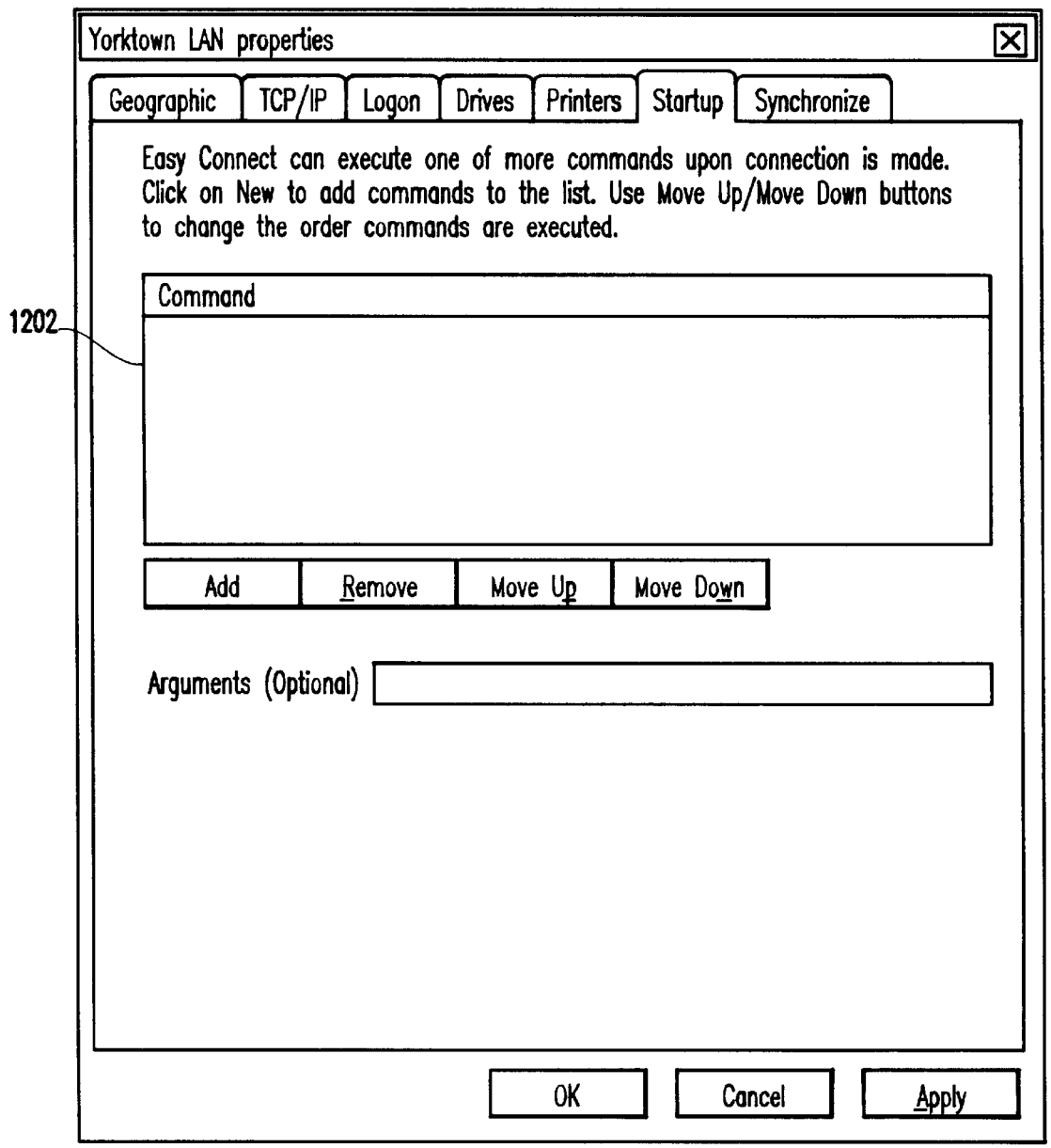
FIG. 12 shows a configuration screen for specifying startup commands.

The input screen in FIG. 12 allows the user to configure any set of applications that should be automatically started by the present invention when network connection is established. A user can add or remove such applications from the display in 1202.

Figure 13:
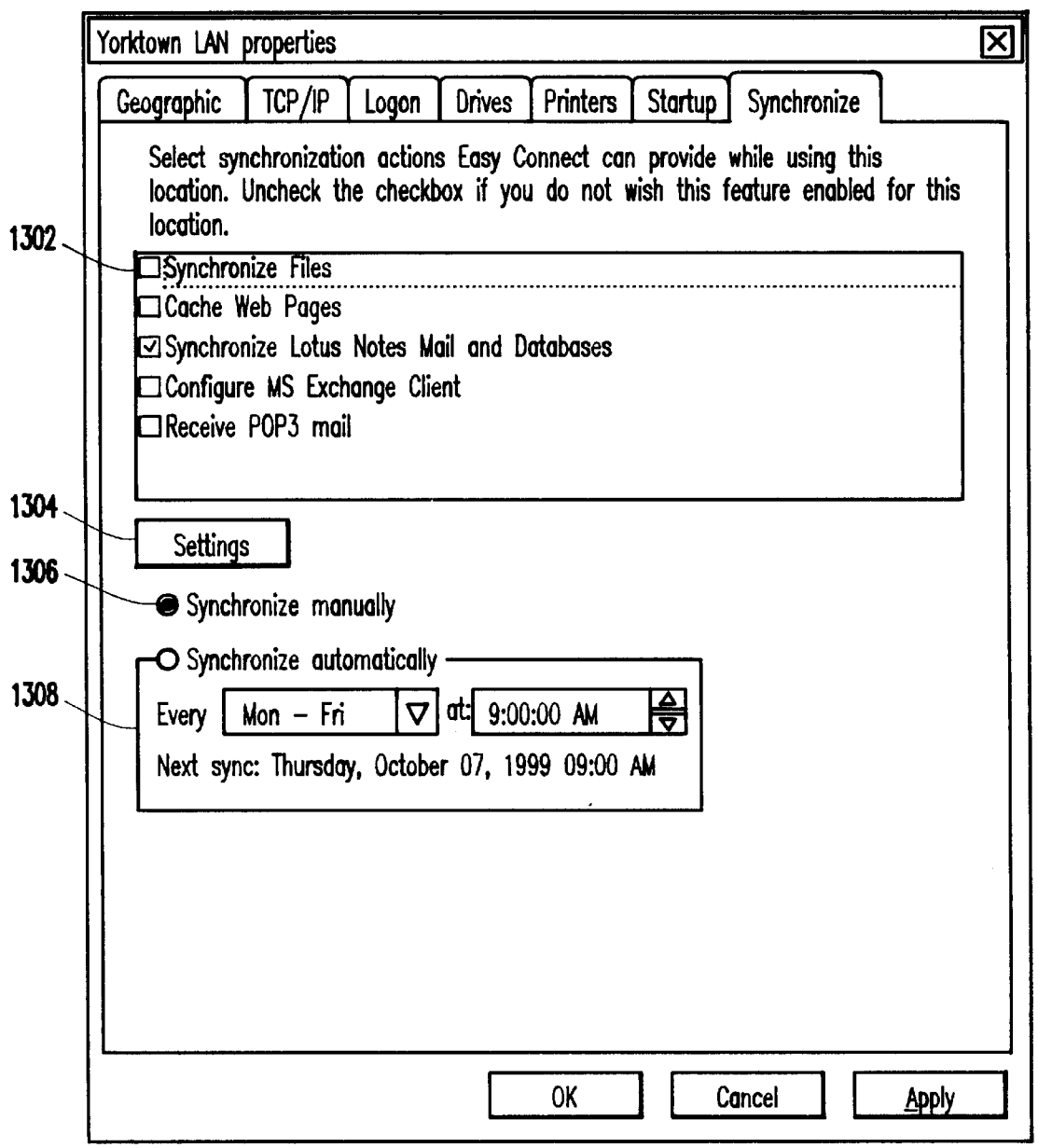
FIG. 13 shows a configuration screen for specifying synchronization actions.
Figure 14:
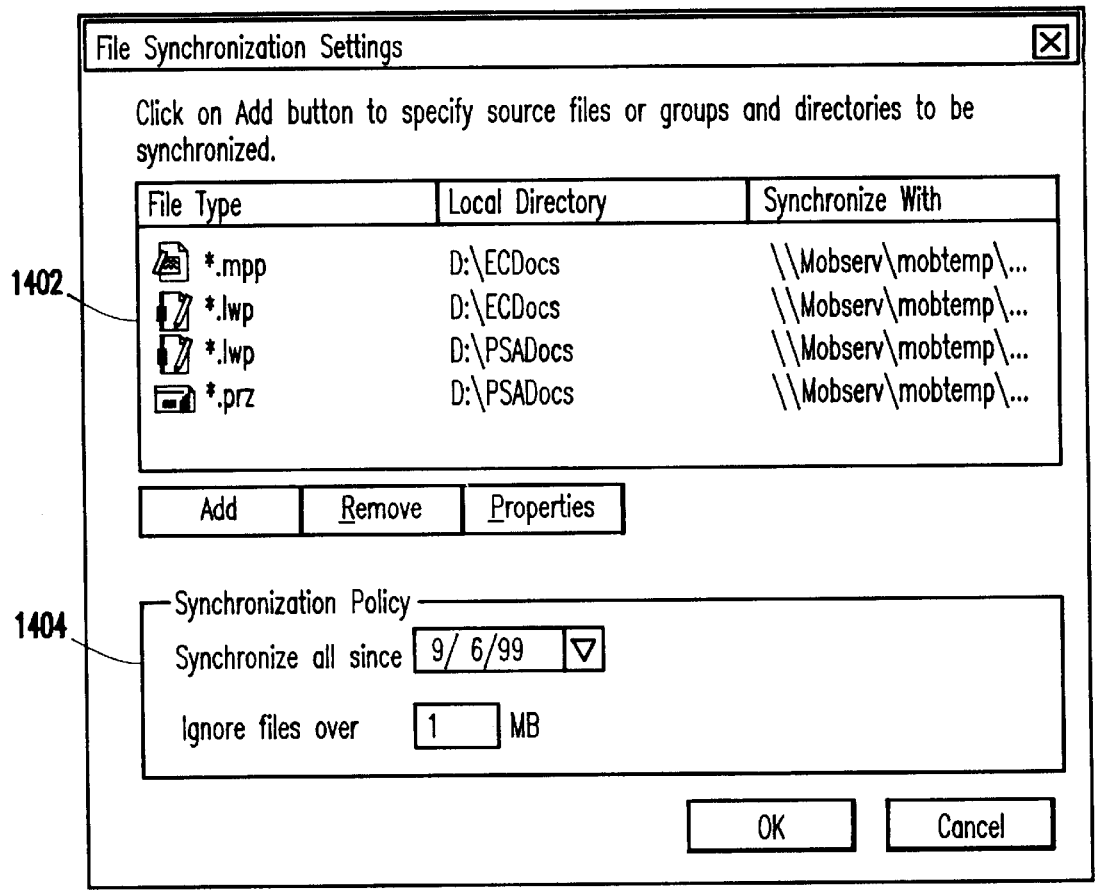
FIG. 14 shows a configuration screen for specifying file synchronization settings.

FIG. 13 shows the configuration screen that allows the user to specify the information task that should be performed when a network connection is available (e.g., when a network connection is established). These tasks include synchronizing file data, caching web pages, synchronization electronic mail using the Lotus Notes@, IMAP® or Post Office Protocol Version 3 (POP3; an Internet standard under the Internet Engineering Task Force (IETF)) protocols.

A check mark in 1302 indicates to the present invention that a user would like to perform that specific task. A user can also specify if the synchronization of the information task is initiated manually 1304 or automatically 1306.

It is noted that the synchronization operation is for reflecting the changes made locally to the back-end server. That is, for example, when people travel, they may make a copy or work on a local file (e.g., such as a spreadsheet or document stored on a laptop) and work on that copy in a disconnected manner. A problem arises in that the local copy may be more current (recent) than the one stored on the server (network) copy. Such copies must be synchronized or reconciled with one another, and such a local copy should be updated to the server. Thus, such synchronization reflects the local changes made to the server.

In other instances, if the data available on the server is more recent than the data available on the local computer, then the latest changes should be made available to the local computer.

As another example, consider an insurance agent traveling and that the applicable actuarial rates change while the agent is traveling. Such rate changes must be made available to (synchronized) the agent. Thus, the rates at the server will update (be synchronized with) the rates at the local machine.

Depending upon the policies selected by the user, such synchronization may be performed transparently (or otherwise) to the user while the network connection is made. For example, a protocol may be established such that a later (most current) file will update an earlier file.

Alternatively, all of the files may be saved for archival, or a backup version of the file may be preserved. Other protocols may also be provided depending upon the designer's constraints and requirements.

A user can further specify details about each information task by highlighting an entry in 1302 and selecting the Settings button 1308. When a user selects the "Synchronize Files" option from 1302, the user is presented with the input screen shown in FIG. 14. Here, the user can specify a set of files names or types, their location and destination directories. The set of currently configured files is displayed in 1402. The user can also specify the synchronization policy in 1404. The currently supported policies are "Synchronize all files since(date)" and "Ignore files overMB(specific size) ". Other policies envisioned which could be implemented by the present invention includes conflict resolution policy in which two copies are updated independently of one another. Such a conflict resolution policy would indicate how to handle such a situation and how to synchronize such files.

Further, it is noted that, with regard to FIG. 13, a priority for the items in 1302 can be set up in advance. Hence, for example, if mail is most important to a user, the user in advance would specify the order of the items such that the "Receive POP3 mail" is processed first. Thus, each time the user connects, the Receive POP3 mail would be processed first.

Figure 15:
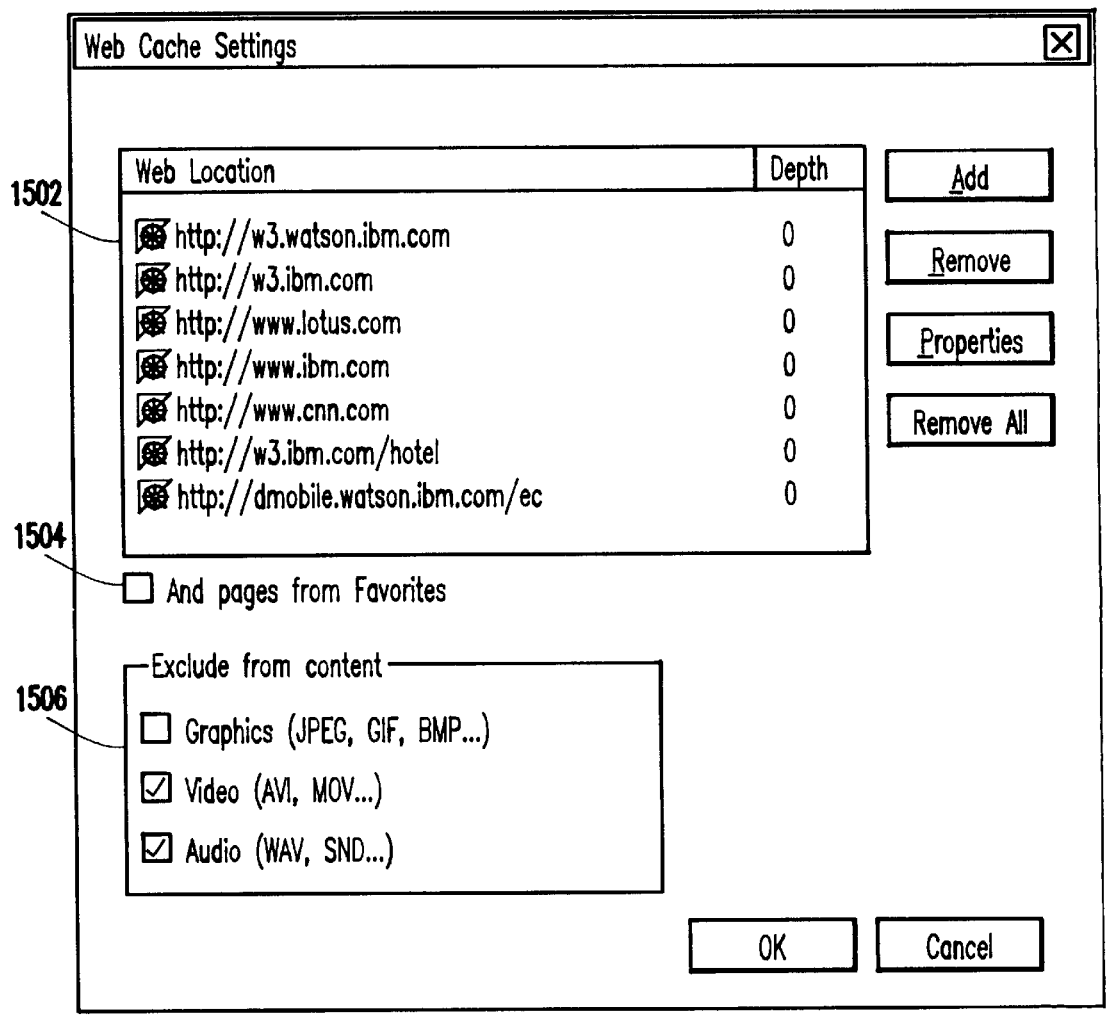
FIG. 15 shows a configuration screen for specifying web hoarding settings.

When a user selects the "Cache Web Pages" option from 1302, the user is presented with the input screen shown in FIG. 15. A user can specify the set of URLs (Uniform Resource Locators) along with the depth for each URL. It is noted that "depth" refers to the level of detail of the information provided (e.g., number of Web pages). For example, each URL may contain other URLS which may contain other URLs. Hence, designating a depth will provide a predetermined level or depth of relevant information to the user. The deeper the depth, the more detailed the information will be provided and the more information which will be cached by the system. A user also specifies the frequency at which URLs are checked for updates. For example, if the frequency is set to "1 hour", then the Synchronization Manager would check the URL for updates only once an hour. Other values for frequency including but not limited to "Every 15 minutes", "Every Week", and "Every Month", can also be specified by the user.

The configured set of URLs is displayed in 1502. A user can also add pre-configured set(s) of URLs by importing them from the favorite folder 1504 as supported by the Microsoft's Internet Explorer® or Netscape Navigator®. A user can also instruct the software to ignore caching the graphics, video, and/or audio data files embedded in the URLs. This is performed by checking (e.g., with a check mark) the box next to each option in 1506.

Figure 16:
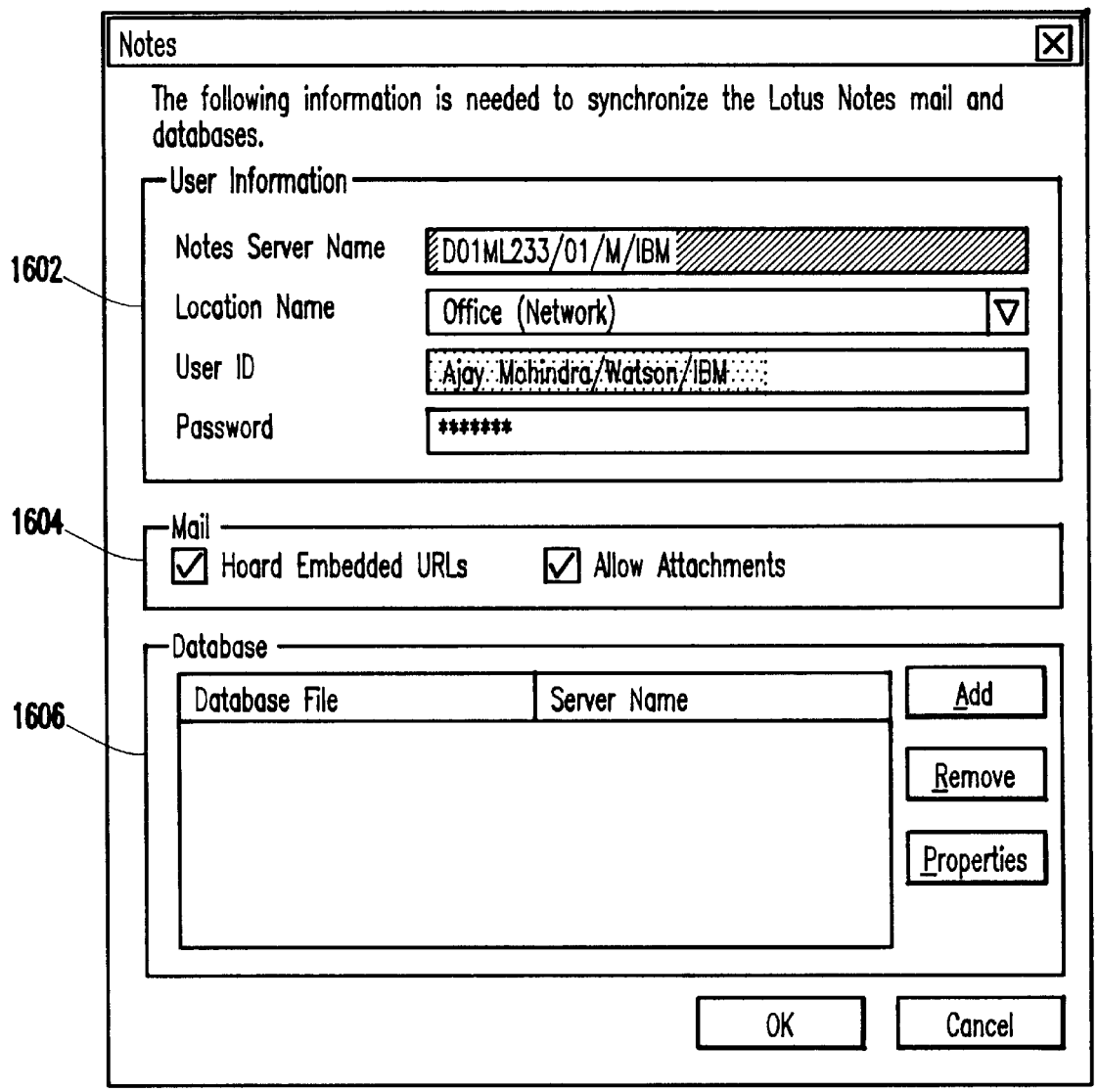
FIG. 16 shows a configuration screen for specifying Lotus Notes® synchronization settings.

When a user selects the "Synchronize Lotus Notes Mail and Databases" from 1302, the user is presented with the input screen shown in FIG. 16. The user enters relevant information needed to synchronize Lotus Notes® mail. This information 1602 includes Notes Mail Server Name, name of the Location Document, User-Id and Password. A user can also indicate by checking the appropriate box in 1604 if embedded URLs in Notes® mail should be hoarded or of attachments should be downloaded with the mail. A user also specifies the set of Lotus Notes® databases that should be synchronized in 1606. The information is specified as the name of the database and the server name.

Figure 17:
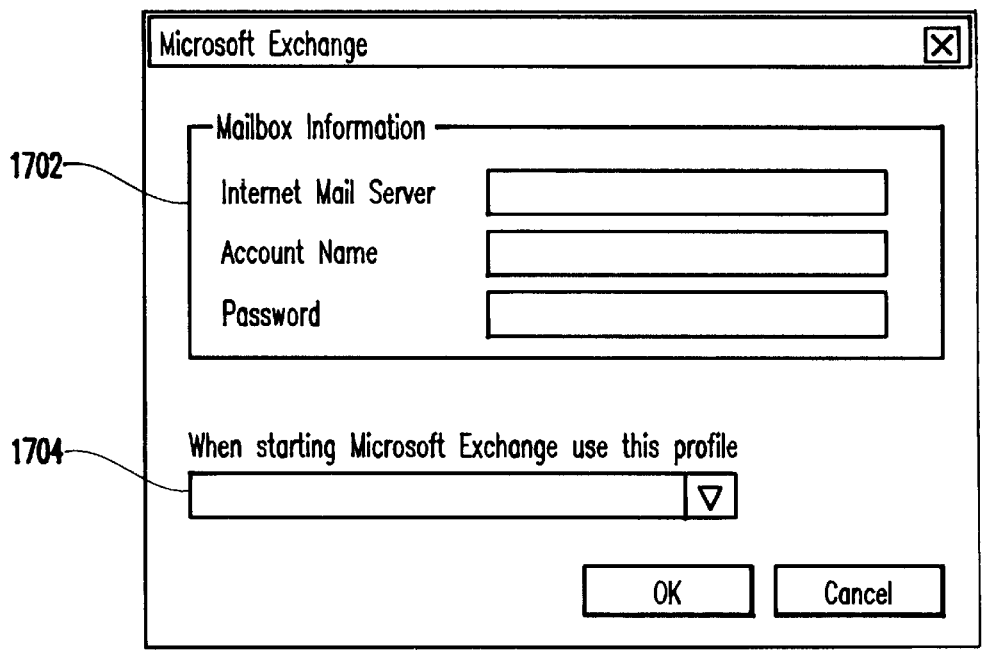
FIG. 17 shows a configuration screen for specifying Microsoft® Exchange Mail settings.

When a user selects the "Configure Microsoft Exchange Client" from 1302, the user is presented with the input screen shown in FIG. 17. The user specifies in 1702 the Internet Mail Server, account name, password and the name of the Microsoft Exchange client profile 1704.

Figure 18:
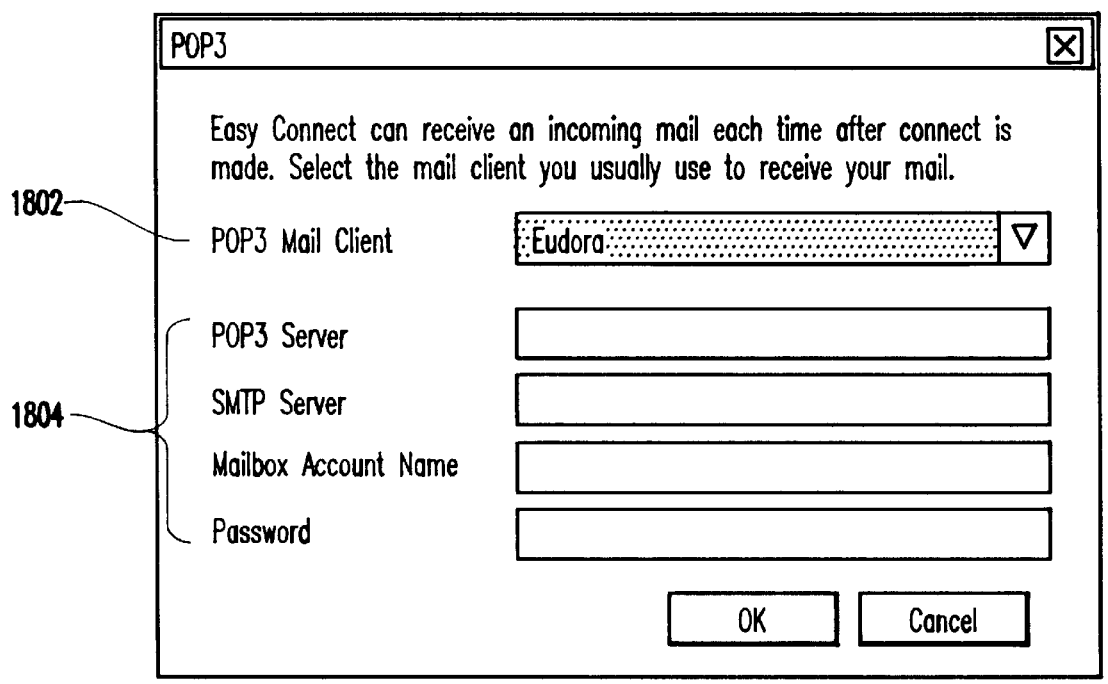
FIG. 18 shows a configuration screen for specifying POP3 mail settings.

When a user selects the "Receive POP3 mail" from 1302, the user is presented with the input screen shown in FIG. 18. The user specifies the name of the POP3 client to use for reading mail 1802. In 1804, the user also specifies the name of the POP3 server, the name of the Simple Mail Transfer Protocol (SMTP) Server, Mailbox account name and the user's password.

After the user has entered the configuration information for the newly created location, the present invention stores the information internally in a "Location Object" data structure. The location object data structure encapsulates four data structures including a geographic object, a connectivity object, a resource object, and a synchronization object. This information is persistently stored in the Windows Registry.

The geographic object contains information about the physical attributes of the location, as described in FIG. 6. The connectivity object contains information about the communication subsystem as described in FIGS. 7 and 8. The resource object contains information about the network resources that are specific to the location as described in FIGS. 9–12. The synchronization object contains information about the location specific synchronizing information as described in FIGS. 13–18.

After configuring all the locations that the users wants, configuring the computer system is as simple as selecting the desired location as the default location via the Location Manager GUI in FIG. 4. When a user designates a particular location as the default location, the present invention uses the information stored in the registry to configure the system according to the preferences specified by the user. A single selection gives the computer a totally different personality appropriate for that physical location.

In operation, the present invention uses standard programming Application Program Interfaces (APIs) to configure all the network connectivity parameters for the computer system, start application services, map network drives and share folders. When the synchronization is initiated either by an automatic process or by the user, the present invention determines if the computer is connected to the network. If the computer is not connected, then the present invention establishes a network connection using a dial-up modem or a local area network (LAN). After the connection has been established, the present invention synchronizes file data, sends and receives electronic mail and caches web pages as specified by the user for the current default location.

FIG. 19 illustrates a typical hardware configuration (e.g., for the client's portable device such as a laptop, etc.) of an information handling/computer system 1900 in accordance with the invention. The computer system 1900 preferably has at least one processor or central processing unit (CPU) 1911.

The CPUs 1911 are interconnected via a system bus 1912 to a random access memory (RAM) 1914, read-only memory (ROM) 1916, input/output (I/O) adapter 1918 (for connecting peripheral devices such as disk units 1921 and tape drives 1940 to the bus 1912), user interface adapter 1922 (for connecting a keyboard 1924, mouse 1926, speaker 1928, microphone 1932, and/or other user interface device to the bus 1912), a communication adapter 1934 for connecting an information handling system to a data processing network, the Internet, an Intranet, etc., and a display adapter 1936 for connecting the bus 1912 to a display device 1938 (e.g., in a non-limiting embodiment the display device may be a printer).

In addition to the hardware/software environment described above, a different aspect of the invention includes a computer-implemented method for performing the above method of administering and performing connectivity and information tasks for a mobile user. As an example, this method may be implemented in the particular environment discussed above.

Such a method may be implemented, for example, by operating a computer, as embodied by a digital data processing apparatus, the CPU 1911 in FIG. 19, etc., to execute a sequence of machine-readable instructions. These instructions may reside in various types of signal-bearing media.

This signal-bearing media may include, for example, a RAM contained within the CPU 1911, as represented by the fast-access storage for example. Alternatively, the instructions may be contained in another signal-bearing media, such as a magnetic data storage diskette 2000 (FIG. 20), directly or indirectly accessible by the CPU 1911.

Whether contained in the diskette 2000, the computer/ CPU 1911, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the unique and unobvious features of the present invention, a user is provided with a centralized facility to administer and manage all computer system configuration parameters that need to be updated whenever the user and his computer change physical location. In addition, it also provides the user with a single point of control for managing all information tasks such as synchronizing file data, sending and receiving electronic mail, and cache web pages for offline browsing.

Thus, a key difference between the present invention and Symantec's Mobile Essentials® and 3Com's DynamicAccess Mobile Connection Manager® is information task management. In addition to improved location management, the present invention allows the user to centrally manage and perform information management tasks such as synchronizing file data, sending and receiving electronic mail, and cache web pages for offline browsing.

While the invention has been described in terms of preferred embodiments, those skilled in the art will recognize that the invention can be practiced with modification within the spirit and scope of the appended claims.

For example, while the exemplary implementation above has been described with regard to a portable computing device (e.g., a laptop computer), other devices such as personal data assistants (PDAs), Palm Pilots, portable telephones, products such as MobilonPro™ produced by Sharp Corporation, etc. will find equal benefit with the features of the present invention.

Thus, the invention makes it easy to operate with multiple, heterogenous networks with no special skills required by the user. The technical details of the network and connection type are hidden from the user in the aforementioned Location Object Data Structure. The detailed information contained within the Location Object Data Structure preferably is prepared in advanced by a company's Information Technology department and either preloaded on the user's system, sent to the user as part of an e-mail attachment, or downloaded from a company Web site and subsequently imported by the user.

What is claimed is:

1. A method for creating a new location in a software system for a portable device to allow said device to connect to a physically remote network, said method comprising:

presenting a user of said portable device with a series of user input interfaces to allow the user to configure a new location with all of the relevant configuration information for said new location, the information specified by the user being stored under a user-specified name;

when an information synchronization is initiated either by an automatic process or by the user, determining whether the portable device is connected to the network;

if the computer is not connected, then establishing a network connection using a dial-up modem or a local area network (LAN); and after the connection has been established, synchronizing file data, sending and receiving electronic mail and caching web pages as specified by the user for a current default location.

2. The method according to claim 1, further comprising:

providing the user with an interface to specify the geographic information relevant to the new location.

3. The method according to claim 2, further comprising:

providing an interface for the user to specify a Transmission Control Protocol/Internet Protocol (TCP/IP) and dial-up related information for the new location;

specifying by said user an IP Address, a subnet mask, and a default gateway address for use with the new location;

specifying by said user a Windows Internet Naming Service (WINS) server address; and specifying by said user whether to use the domain name server for the new location, and if so specifying a Host Name, domain name, dynamic host configuration protocol (DHCP) server name, and Domain Name Server (DNS) Search Order and Domain Name suffix order.

4. The method according to claim 3, further comprising:

if the new location is being configured to use a dial-up modem connection, then specifying, by the user, information including a telephone number to dial, a number of retries, and information related to an account of the user.

5. The method according to claim 4, further comprising:

designating information about an identity of a computer of said portable device when said portable device is connected to the network, including a computer name and a name of a workgroup or domain name if the computer belongs thereto.

6. The method according to claim 5, further comprising:

designating information about a set of network drives for being mapped onto the portable device when the network connectivity is established, wherein said set of drives specified by the user is automatically mapped on the portable device when the network connection is established.

7. The method according to claim 5, further comprising:

specifying by the user any of a local drive and a folder of said portable device for sharing with other computers on the network; and configuring by said user a set of hardware devices for the new location, wherein after being configured by the user, said set of hardware devices is automatically configured when a user connects using a specific location.

8. The method according to claim 7, further comprising:

providing an input screen to said user which allows the user to configure any set of applications for being automatically started when a network connection is established.

9. The method according to claim 8, further comprising:

providing a configuration screen that allows the user to specify an information task for being performed when the network connection is established, wherein said information task includes any of synchronizing file data, caching a web page, and synchronizing electronic mail using a mail exchange protocol.

10. The method according to claim 9, wherein the user can further specify details about each information task by highlighting an entry and selecting a settings button on the configuration screen, when a user selects a "Synchronize Files" option, the user selectively specifies a set of files names or types, their location and destination directories, and wherein the set of currently configured files is displayed, and the user selectively specifies a synchronization policy.

11. The method according to claim 10, wherein a priority for processing items and displaying said processed items on said GUI is set up in advance.

12. The method according to claim 9, wherein when a user selects to cache web pages, the user is presented with an input screen shown to allow the user to specify a set of Uniform Resource Locators (URLs) along with a depth for each URL.

13. The method according to claim 9, wherein when a user selects an option for synchronizing mail option, the user is presented with an input screen to allow said user to enter relevant information for synchronizing said mail.

14. The method according to claim 9, wherein when a user selects a predetermined option, the user is presented with an input screen to allow said user to specify an Internet Mail Server, an account name, a password and a name of the client profile.

15. The method according to claim 9, wherein when a user selects a predetermined mail option, the user is presented with an input screen which allows said user to specify a name of a client to use for reading mail, a name of a server, a name of a Simple Mail Transfer Protocol (SMTP) Server, a Mailbox account name and the user's password.

16. The method according to claim 1, wherein after the user has entered configuration information for the newly created location, the information is stored internally in a location object data structure.

17. The method according to claim 16, wherein said location object data structure includes at least one of a geographic object, a connectivity object, a resource object, and a synchronization object.

18. The method according to claim 17, wherein the geographic object contains information about physical attributes of the new location, the connectivity object contains information about a communication subsystem, the resource object contains information about network resources that are specific to the new location, and the synchronization object contains information about location-specific synchronizing information.

19. The method according to claim 18, further comprising:
    after configuring all desired locations, configuring a computer system of the portable device by selecting a desired location as a default location, and
    when a user designates a particular location as the default location, said stored information is used to configure the system according to preferences specified by the user.

20. A system for administering and executing connectivity and information management tasks for a portable device, comprising:
    a first unit for selectively performing at least one of adding, deleting, and editing a location object; and
    a second unit for selectively initiating a request for a connection, disconnection, and information synchronization, based on the location object,
    wherein said second unit comprises a connection manager for providing connectivity functionality to establish a network connection using any a modem, a token-ring card and an Ethernet card,
    wherein said connection manager includes a graphical user interface (GUI) to enable a user to initiate synchronization, and
    wherein said connection manager presents the user with a Connect button, a Synchronize button, a Location Manager button, an Exit and Close button, a Details button, and a View Log button.

21. The system according to claim 20, wherein the Connect button instructs the connection manager to establish a connection to the network,
    wherein the synchronize button instructs the connection manager to initiate synchronization,
    wherein the Location Manager button instructs the connection manager to start a program for launching the location manager, the location manager allowing a user to manage all location-specific information.

22. The system according to claim 21, wherein the Details button enables a user to view progress of the connection manager in a status area defined by a status window, and
    wherein the View Log button allows a user to view the log file associated with the connection manager, the log file capturing details about progress of the connection manager session.

23. The system according to claim 22, wherein when a user selects the Location Manager button, the user is presented with the GUI and wherein locations that have already been created and managed by the location manager are displayed with user-supplied names, and
    wherein the location manager allows a user to create and add a new location using an add location icon.

24. The system according to claim 23, wherein said user provides said location manager with information to create a new location.

25. A system for administering and executing connectivity and information management tasks for a portable device, comprising:
    a first unit for selectively performing at least one of adding, deleting, and editing a location object; and
    a second unit for selectively initiating a request for a connection, disconnection, and information synchronization, based on the location object, and
    wherein said second unit comprises a synchronization manager, said synchronization manager including:
        a mail sub-module for sending and receiving electronic mail;
        a file sub-module for synchronizing file data; and
        a Web page sub-module for retrieving and storing Web pages for off-line browsing by a user of said portable device,
    wherein said mail sub-module retrieves mail selectively using a mail exchange protocol.

26. The system according to claim 25, wherein said first unit comprises a location manager.

27. The system according to claim 26, wherein said location manager provides functionality for administering and managing location-specific information, said location-specific information being stored in a registry of said portable device.

28. The system according to claim 25, wherein said second unit comprises a connection manager for providing connectivity functionality to establish a network connection using any of a modem, a token-ring card and an Ethernet card, and
    wherein said connection manager includes a graphical user interface (GUI) to enable a user to initiate synchronization.

29. A software facility for administering and executing connectivity and information management tasks for a portable device, comprising:
    a first module for selectively performing any of adding, deleting, and editing a location object; and
    a second module for selectively initiating a request for a connection, disconnection, and information synchronization, based on said location object,
    wherein said second module comprises a synchronization manager, said synchronization manager including:
        a mail sub-module for sending and receiving electronic mail.

30. The software facility according to claim 29, wherein said synchronization manager further comprises:
   a file sub-module for synchronizing file data.

31. The software facility according to claim 29, wherein said synchronization manager further comprises:
   a Web page sub-module for retrieving and storing Web pages for off-line browsing by a user of said portable device.

32. The software facility according to claim 29, wherein said second module comprises a synchronization manager, said synchronization manager including:
   a file sub-module for synchronizing file data; and
   a Web page sub-module for retrieving and storing Web pages for off-line browsing by a user of said portable device.

33. A software facility for administering and executing connectivity and information management tasks for a portable device, comprising:
   a first module for selectively performing any of adding, deleting, and editing a location object; and
   a second module for selectively initiating a request for a connection, disconnection, and information synchronization, based on said location object,
   wherein said second module comprises a synchronization manager, said synchronization manager including:
      a mail sub-module for sending and receiving electronic mail;
      a file sub-module for synchronizing file data; and
      a Web page sub-module for retrieving and storing Web pages for off-line browsing by a user of said portable device.

34. The software facility according to claim 33, wherein said mail sub-module retrieves mail selectively using a mail exchange protocol.

35. A programmable storage medium tangibly embodying a program of machine-readable instructions executable by a digital processing apparatus to perform a method for computer-implemented administering and executing connectivity and information management tasks for a portable device, comprising:
   selectively adding, deleting, and editing a location object; and
   based on a user input, causing said portable device to selectively initiate a request for any of a connection, a disconnection, and an information synchronization, based on the location object,
   wherein said request is followed by any one of sending and receiving electronic mail, synchronizing file data, and retrieving and storing Web pages for off-line browsing by a user of said portable device.

36. A programmable storage medium tangibly embodying a program of machine-readable instructions executable by a digital processing apparatus to perform a method for computer-implemented administering and executing connectivity and information management tasks for a portable device, comprising:
   presenting a user of said portable device with a series of user input interfaces to allow the user to configure a new location with all of the relevant configuration information for said new location, the information specified by the user being stored under a user-specified name,
   wherein said user input interfaces comprise a Connect button, a Synchronize button, a Location Manager button, an Exit and Close button, a Details button, and a View Log button.

37. A method of administering and executing connectivity and information management tasks for a portable device, comprising:
   selectively performing at least one of adding, deleting, and editing a location object; and
   selectively initiating, by a user of said portable device, a request for a connection, disconnection, and information synchronization based on the location object,
   wherein said selectively initiating by the user includes at least one of sending and receiving electronic mail, synchronizing file data, and retrieving and storing Web pages for off-line browsing by a user of said portable device.

* * * * *